Aug. 24, 1954    A. B. McLAUCHLAN ET AL    2,687,234
AUTOMATIC PROPORTIONER
Filed Aug. 18, 1951    4 Sheets-Sheet 2
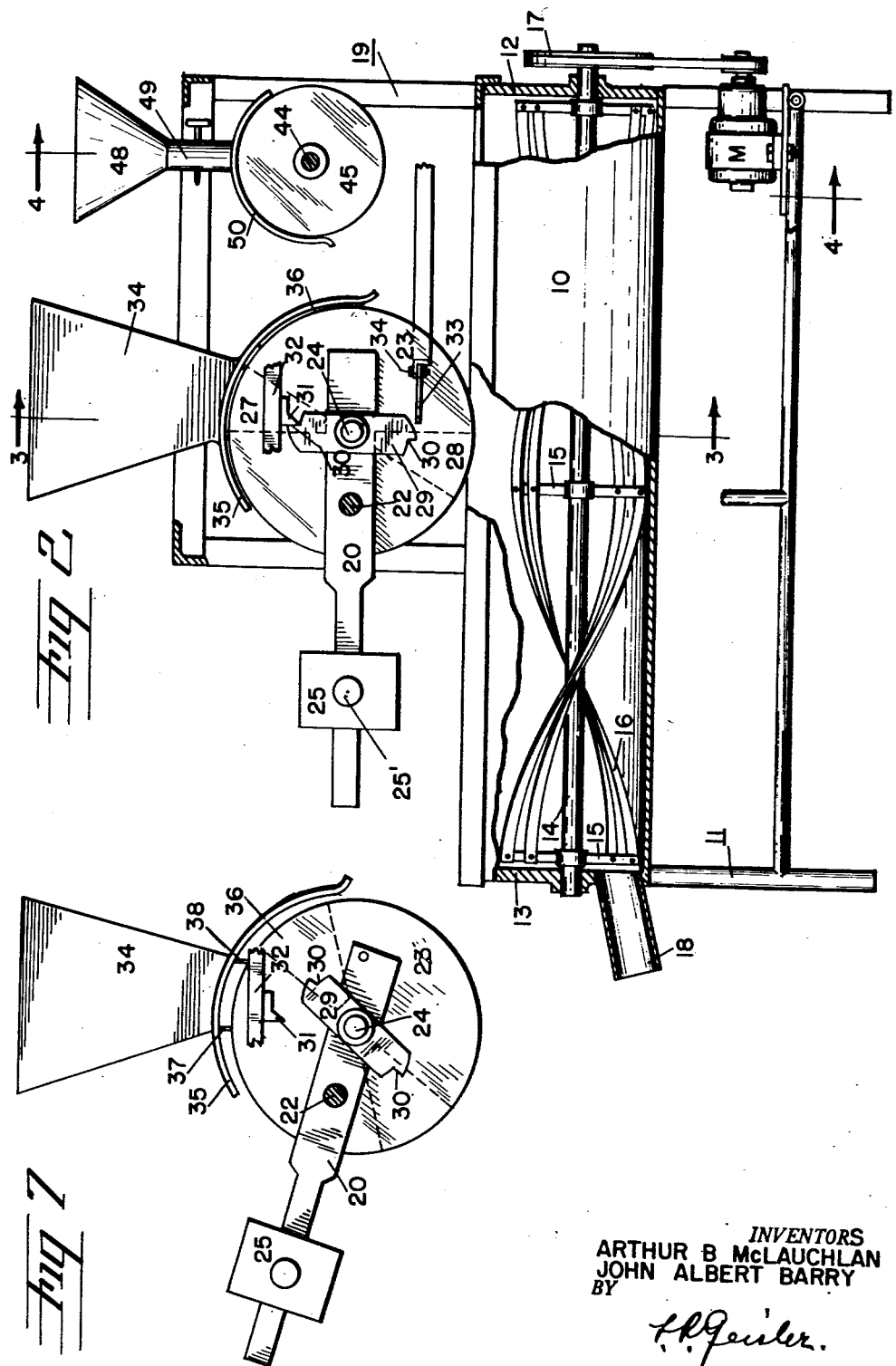
INVENTORS
ARTHUR B McLAUCHLAN
JOHN ALBERT BARRY
BY
*F.R.Geisler*
ATTORNEY Aug. 24, 1954 A. B. McLAUCHLAN ET AL 2,687,234
AUTOMATIC PROPORTIONER
Filed Aug. 18, 1951 4 Sheets-Sheet 3
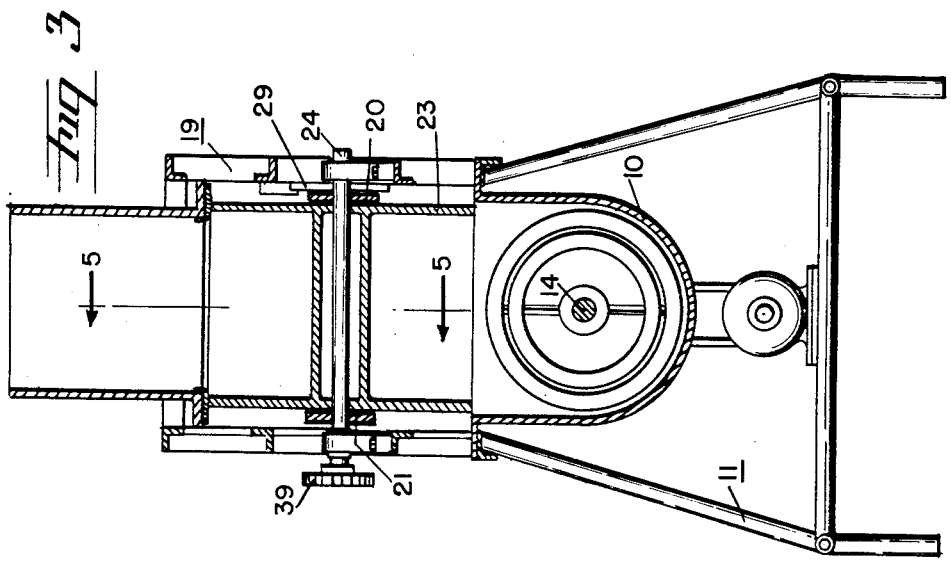
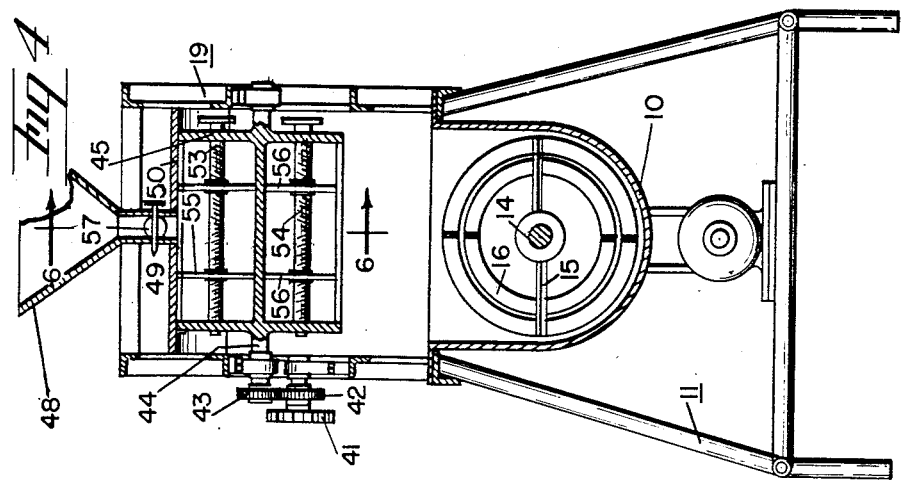
INVENTORS
ARTHUR B. McLAUCHLAN
JOHN ALBERT BARRY
BY
ATTORNEY

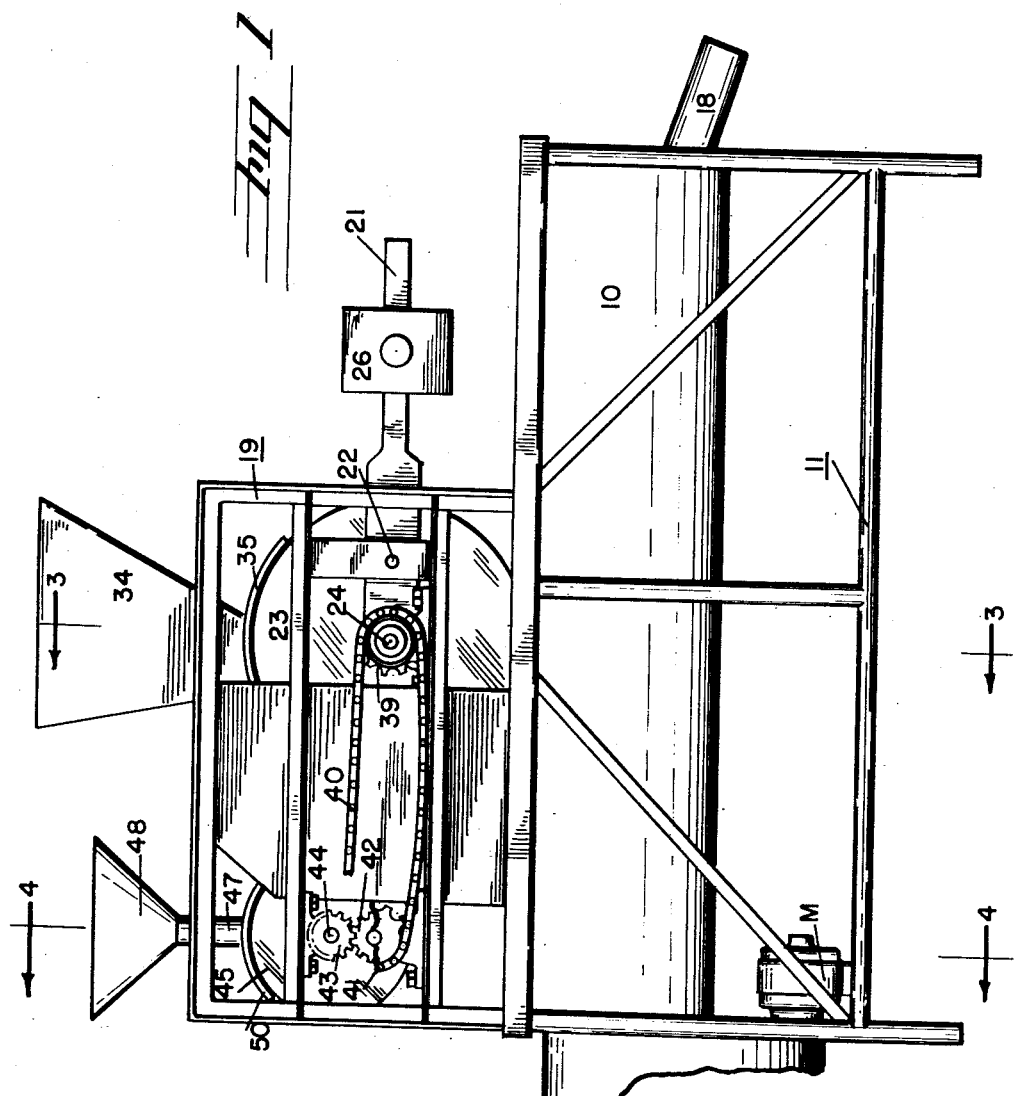

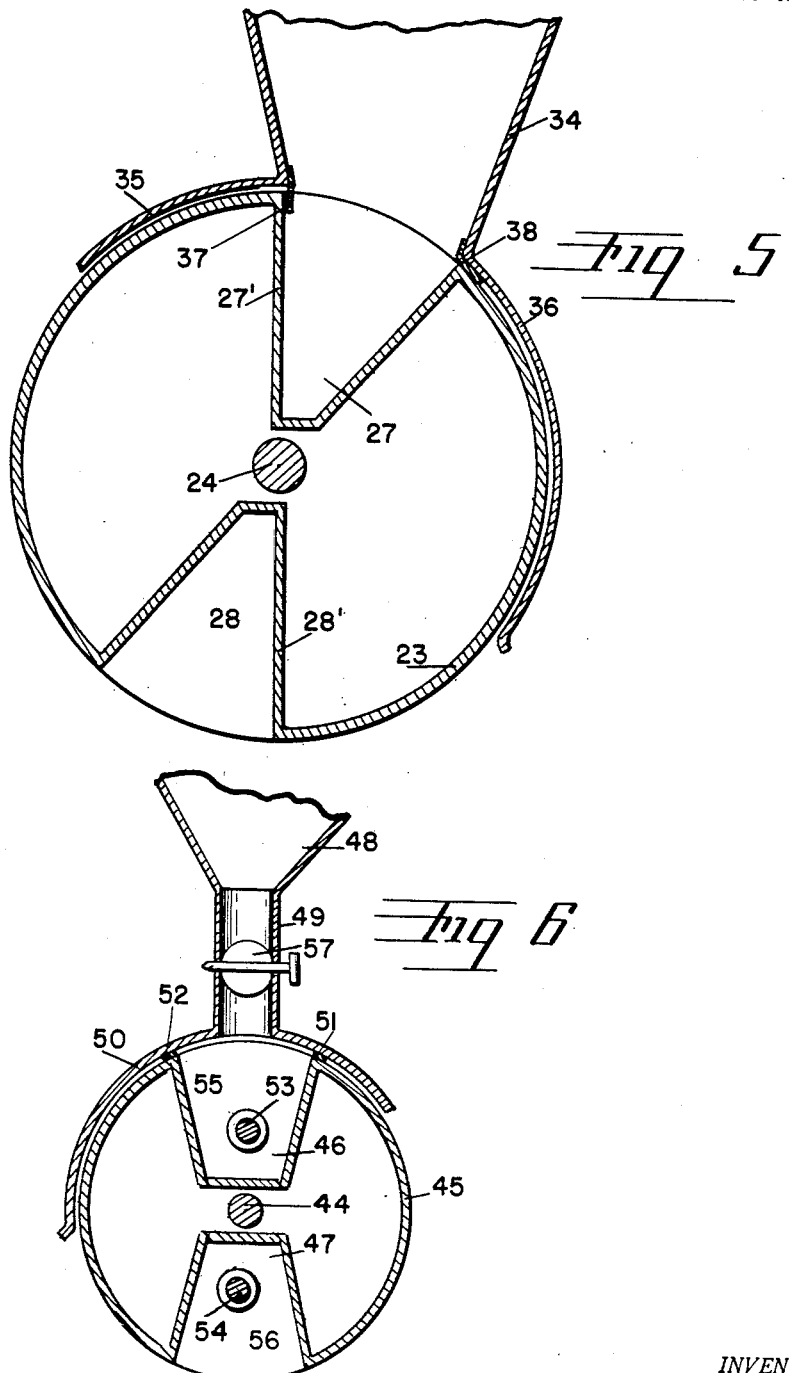

Patented Aug. 24, 1954

2,687,234

UNITED STATES PATENT OFFICE 2,687,234

AUTOMATIC PROPORTIONER

Arthur B. McLauchlan and John Albert Barry, Salem, Oreg., assignors to A. B. McLauchlan Co., Inc., Salem, Oreg., a corporation of Oregon Application August 18, 1951, Serial No. 242,502

5 Claims. (Cl. 222—57)

This invention relates in general to the mixing of materials, for example, foods and ingredients of foods, and relates in particular to the mixing of fruits, preparatory to freezing or canning, or to the mixing of fruits or berries with sugar.

This invention is especially adapted for use when berries, such as strawberries either sliced or whole, are to be mixed with the sugar preparatory to immediate freezing or canning.

It is necessary when such mixing is to be done that a desired predetermined proportion, for example of sugar to berries, be maintained, and when such mixing is a continuing and large scale procedure, the maintenance of the proper ratio of sugar to berries heretofore has necessitated constant care and attention on the part of the operators.

An object of the present invention is to provide an improved proportioner and mixer by means of which the relative proportions of the foods or other ingredients to be mixed will be automatically maintained during a continuous operation, or during repeated operations.

An additional object of the invention is to provide a device of the nature described which will be simple to operate and which will require only a minimum amount of care and upkeep.

A further object of this invention is to provide an automatically operating proportioner and mixer in which the relative amounts of ingredients which are mixed can be readily altered when desired.

Another object of the invention is to provide a proportioning and mixing device suitable for food and ingredients of foods, as well as for other mixable materials, which will be simple and practical in construction and relatively inexpensive to manufacture.

In the following description of my device, from which description the manner in which the above mentioned objects are attained will be apparent, it is assumed, merely for the purpose of illustration, that the device is to be used for mixing sugar and fresh berries preparatory to the freezing of the berries. It is of course to be understood that the use of the device is not limited to any particular ingredients or even limited to food materials.

In the course of the description reference is made to the accompanying drawings in which:

Fig. 1 is a side elevation of the device;

Fig. 2 is a corresponding elevation taken from the opposite side of the device with the near side supporting frame members and housing wall removed, and with portion of the wall of the mixing trough broken away;

Fig. 3 is a transverse vertical section on line 3—3 of Figs. 1 and 2;

Fig. 4 is a transverse vertical section on line 4—4 of Figs. 1 and 2;

Fig. 5 is a fragmentary enlarged vertical section on line 5—5 of Fig. 3;

Fig. 6 similarly is a fragmentary enlarged vertical section on line 6—6 of Fig. 4; and Fig. 7 is a fragmentary side elevation of part of the device shown in Fig. 2 illustrating the operation of the same during the discharging of a predetermined amount of material.

Referring first to Figs. 1 and 2, a mixing trough 10, having a semi-cylindrical bottom, is supported in a suitable frame indicated in general by the reference character 11. The ends of the trough 10 are closed by the end plates 12 and 13 (Fig. 2) and a shaft 14, extending along the axis of the semi-cylindrical bottom of the trough, is rotatably journaled in the end plates 12 and 13. Bracket arms 15, rigidly secured on the shaft 14, support longitudinally-extending spiral vanes 16. One end of the shaft 14 beyond the trough carries a pulley 17, and a sprocket and chain connection with a motor M produces rotation of the shaft 14 and spiral vanes. The motor M is supported on the frame 11 below the trough 10. The spiral vanes 16 are so designed that their rotation (counterclockwise as viewed from the right of Fig. 2) not only mixes the ingredients in the trough 10 but at the same time moves the ingredients from right to left (as viewed in Fig. 2) to the discharging outlet located at the bottom of the end plate 13. A discharging spout 18 is connected to this discharging outlet.

An upper housing frame, indicated in general by the reference character 19, is supported on the frame 11 above the trough 10 and back from the trough outlet in the relative position shown in Figs. 1 and 2. A drum-carrying frame consisting of a pair of normally horizontal side members 20 and 21, located at opposite sides of the housing frame 19 respectively, and connected by suitable cross members (not shown), is pivotally mounted on a shaft 22. The shaft 22 is supported at its ends in the respective sides of the housing frame 19.

A cylindrical drum 23 is secured on an axial shaft 24 which shaft is rotatably journaled in the side members 20 and 21 and is arranged parallel to the shaft 22 and spaced a short distance from the shaft 22. A pair of counter-weights 25 and 26 are slidably supported on the opposite or outer ends of the side members 20 and 21 respectively and are adjustably secured by means of set screws 25'. The purpose of these adjustable weights 25 and 26, as will be apparent, is to counterbalance the weight of the drum 23 together with the weight of any additional predetermined amount of material deposited in the drum in a manner presently to be explained. Thus the side members 20 and 21 are in effect lever arms fulcrumed at a stationary point indicated by the shaft 22, having adjustable lever arm weights 25 and 26 for maintaining a predetermined load which is represented by the drum 23 and its contents.

The drum 23 is formed with two pockets 27 and 28 (Fig. 5) which extend transversely across the drum between the two side walls of the drum. These pockets are identical in size, and oppositely positioned in the drum, and, as shown clearly in Fig. 5, are both similarly off center. Thus if the drum 23, when free to rotate with its supporting shaft 24, is momentarily stationary in the position shown in Fig. 5, with the upper pocket 27 empty and with the walls 27' and 28' of the pockets 27 and 28 vertical, the depositing of any material in the upper pocket 27 will cause the drum to be overbalanced and to rotate in clockwise direction.

Referring now to Figs. 2 and 7, a cam arm 29 is keyed on one end of the drum shaft 24 so as to rotate with the drum shaft 24 and drum 23. This cam arm 29 extends an equal distance on both sides from the shaft 24 and is parallel to the walls 27' and 28' (Fig. 5) of the pockets 27 and 28 respectively. Each end of this cam arm 29 (Fig. 2) terminates in an identical, but oppositely positioned, cam shoulder or notch 30. A stationary pawl or stop 31 is secured on a side member 32 on the frame 19 for engagement with either of the cam notches 30 when the cam arm assumes vertical position, and when the weighted side members 20 and 21, carrying the shaft 24, are in the horizontal position shown in Fig. 2. A flat spring 33 (Fig. 2), mounted on a block 34 attached to a side member on the frame 19, terminates a slight distance below and a slight distance off center (thus to the right as viewed in Fig. 2) of the bottom cam of the arm 29 when the drum 23 is in the normal raised position of Fig. 2.

A discharging hopper 34, the open bottom of which corresponds approximately in area to the openings for the pockets 27 and 28 in the cylindrical surface of the drum 23, is supported in the top of the frame 19 in the stationary position shown in the drawings. The two converging sides of the hopper 34 terminate at the bottom in outward flanges 35 and 36 (Figs. 2 and 5), and these flanges are curved to correspond to the cylindrical surface of the drum 23. Thus when the drum 23 is in the normal raised position of Figs. 2 and 5, these flanges 35 and 36 follow the drum surface for some distance on both sides of the hopper with only slight spacing between the flanges and drum surface.

When the drum 23 is in the normal raised position illustrated in Fig. 2, with the counterweights 25 and 26 positioned so as to counterbalance the weight of the drum together with the weight of the desired amount of material (for example, berries) to be measured and delivered into the trough 10, the delivery of the berries into the hopper 34, by an endless belt conveyor or by any other suitable means (not shown) will result in berries being deposited in the upper pocket (in this instance pocket 27) of the drum 23. However, when the weight of the deposited berries in the drum pocket passes beyond the predetermined amount, the combined weight of the drum and berries will then overbalance the weights 25 and 26 and cause the side members 20 and 21, which support the drum shaft 24, to be tilted to the position shown in Fig. 7. When this takes place the cam arm 29 will be moved downwardly a sufficient distance to clear the pawl 31 and thus the cam arm 29 becomes disengaged from the pawl 31. Since the drum 23 is now free to rotate, the weight of the berries in the upper pocket of the drum produces clockwise rotation of the drum (as viewed in Figs. 2 and 7) and the berries in the upper pocket are discharged into the trough 10. With the lowering of the drum and cam arm 29 the bottom cam on the arm 29 will bear against the flat spring 33 and the spring 33 exerting upward pressure on the cam surface will contribute to the rotational momentum given the drum and the rotational momentum will continue until the cam notch at the other end of the cam arm 29 reaches the stationary pawl 31, and since, with the discharge of the berries the side members 20 and 21 will again have resumed their horizontal position, the drum will come to a positive stop with the drum pocket 28 now at the top. The operation is then repeated.

Flexible wiper blades 37 and 38, shown most clearly in Figs. 5 and 7, are provided at the bottoms of the sides of the hopper 34. These flexible blades are of sufficient size to maintain rubbing contact with the cylindrical surface of the drum even when the drum is in lowered rotating position, and thus these blades prevent any berries from passing or leaking out between the bottom of the hopper 34 and the periphery of the drum 23. The hopper 34 preferably is large enough to accommodate sufficient berries to fill each drum pocket immediately, as each pocket in turn comes into registration with the hopper, and thus the cycles are repeated in rapid succession as long as desired, or as long as the supply of berries for delivery into the trough 10 continues.

On the opposite end of the drum shaft 24 from the cam arm 29, a sprocket wheel 39 (Figs. 1 and 3) is keyed on the shaft 24. A sprocket chain 40 connects sprocket wheel 39 with a sprocket wheel 41 near the rear of the frame 19. A gear 42 (see also Fig. 4) keyed to the same stub shaft with the sprocket 41 meshes with a gear 43 which is keyed on the end of a shaft 44 rotatably mounted in the frame 19.

A second drum 45 (Figs. 1, 4 and 5), somewhat similar to drum 23, in that it has two oppositely arranged pockets 46 and 47, is secured on the shaft 44. The pockets 46 and 47 in this second drum 45 are preferably centered on the drum instead of being off center, and also the drum 45 preferably is smaller than the drum 23.

In the example illustrated in the drawings, where the larger drum is intended to be used for delivering a predetermined amount of berries at successive intervals into the trough 10, the second drum 45 is intended to be used similarly for delivery of a predetermined amount of sugar with each delivered amount of berries.

A hopper 48 is supported on the top portion of the frame 19 above the drum 45. A tube 49 (Figs. 2, 4 and 6) leads from the bottom of this funnel-shaped hopper to the top of the drum 45. A shield 50 surrounds the bottom end of the tube 49 and, as shown in Figs. 2 and 6, this shield is curved to correspond with the cylindrical surface of the drum 45 and is spaced only a very slight distance from the drum surface.

Wiper blades 51 and 52 (Fig. 6) on the shield 50 prevent any of the sugar or other material delivered into the drum pockets from leaking out between the shield 50 and the cylindrical surface of the drum.

A pair of rotatable adjusting shafts 53 and 54 (Figs. 4 and 6), with the opposite ends of each formed with right and left hand threads respectively, extend across the drum 45 through the pockets 46 and 47 respectively. Pairs of adjustable vertical partitioning slides 55, 55 and 56, 56 are mounted on these bars 53 and 54 respectively. The purpose of these slides, as apparent from Fig. 4, is to adjust the capacity of the drum pockets 46 and 47 for receiving the material (sugar) delivered from the hopper 48 into the drum pockets. A damper 57 is mounted in the tube 49 to enable the passage of material from the hopper 48 to be shut off entirely when desired.

Thus, since the two drums 23 and 45 are connected by means of the sprocket chain 40, each half rotation of the drum 23 results in the half rotation of the connected drum 45. With each half rotation of the drums a predetermined amount of berries, as provided for by the adjusted position of the weights 25 and 26, is discharged into the trough 10, and simultaneously a predetermined amount of sugar, determined by the adjusted position of the partitioning slides 55, 55 and 56, 56 in the pockets of the drum 45, is discharged into the trough. As the berries and sugar are dropped into the trough 10 with each cycle of operation, the two ingredients are mixed together by the moving vanes 16 in the trough 10 and the mixed ingredients are finally discharged from the trough spout 18. The depositing of the ingredients from the trough will continue automatically as long as desired, or as long as the supply of ingredients lasts, and the proportions in the meanwhile will be constantly maintained.

Varying the proportions may be easily accomplished either by adjusting the weights 25 and 26 or by adjusting the partitioning slides 55 and 56, or by combining both such adjustments.

While we have illustrated and described the two drums 23 and 45 of our proportioner and mixer as provided with two measuring pockets each, it would be possible to have more than two pockets in each drum. The pockets would of course have to be equally spaced on each drum, with the same number of pockets for each, and the cam member connected with the drum 23 modified accordingly.

Other minor modifications would also be possible without departing from the principle of our invention.

We claim:

1. In a device of the character described, a rotatable cylindrical drum mounted on a horizontal axial shaft, a plurality of identical symmetrically-positioned pockets extending inwardly from the cylindrical surface of said drum, a stationary hopper positioned above said drum for discharging into said pockets consecutively, means between said hopper and the drum surface to prevent material from said hopper escaping over the surface of said drum, a frame pivotally mounted on a horizontal axis said axis being parallel to said drum shaft, said drum shaft supported on said frame at one side of the pivotal mounting of said frame to enable said drum to overbalance said frame, means limiting the movement of said frame, adjustable means normally holding said frame in substantially horizontal position in opposition to the weight of said drum and the weight of a predetermined amount of material in said drum, whereby to hold said drum in raised position adjacent the bottom of said hopper but enabling said frame to become tilted and said drum to drop to lowered position when said predetermined amount of material in said drum is exceeded, an engageable member connected with and rotated with said drum, a stationary engaging element positioned above said member to engage said member whenever said drum is in raised position with one of said pockets in registration with said hopper, said element, said member and said hopper so arranged that when said drum is in raised position with a pocket in registration with said hopper said registering pocket will be off-center on said drum, whereby when a deposit of material from said hopper into such registering pocket is of sufficient amount to cause said drum and said deposited material to tilt said frame and move said drum to lowered position, said engageable member will momentarily become disengaged from said stationary engaging element and said drum will be partially rotated by the weight of material in such pocket until the material is discharged from the pocket, a second cylindrical drum rotatably mounted on a horizontal axis near said first drum, said second drum having the same number of symmetrically-positioned pockets as said first drum, a hopper above said second drum adapted to discharge into said second drum pockets successively, a shield connected with the bottom of said second hopper and extending over said second drum to prevent material from said second hopper escaping over the surface of said second drum, and means connecting said drums, whereby rotation of said first drum will cause equal degree of rotation of said second drum.

2. In a device of the character described, a rotatable cylindrical drum mounted on a horizontal axial shaft, a pair of identical diametrically opposite pockets extending inwardly from the cylindrical surface of said drum, a stationary hopper positioned above said drum for discharging into said pockets consecutively, flanges extending outwardly from the bottom of said hopper and following the contour of the adjacent portion of the drum surface, means between said flanges and the drum surface to prevent material from said hopper escaping over the surface of said drum, a frame pivotally mounted on a horizontal axis, said axis being parallel to said drum shaft, said drum shaft supported on said frame at one side of the pivotal mounting of said frame, to enable said drum to overbalance said frame, means limiting the movement of said frame, adjustable counterweights on said frame on the opposite side of said pivotal mounting normally holding said frame in substantially horizontal position with said drum in raised position adjacent the bottom of said hopper but enabling said frame to become tilted and said drum to drop to lowered position when the weight of material deposited in a drum pocket exceeds a predetermined amount, an engageable member connected with and rotated with said drum, engageable shoulders on said member, a stationary engaging element positioned above said member to engage one of said shoulders of said member whenever said drum is in raised position with one of said pockets in registration with said hopper, said element, said member and said hopper so arranged that when said drum is in raised position with a pocket in registration with said hopper said registering pocket will be off-center on said drum, whereby when a deposit of material from said hopper into such registering pocket is of sufficient amount to cause said drum and said deposited material to tilt said frame and move said drum to lowered position said engageable member will momentarily become disengaged from said stationary engaging element and said drum will be partially rotated by the weight of material in such pocket until the material is discharged from the pocket, a second cylindrical drum rotatably mounted on a stationary horizontal axis near said first drum, said second drum having a pair of diametrically opposite pockets, a hopper above said second drum adapted to discharge into said second drum pockets successively, a shield connected with the bottom of said second hopper and extending over said second drum to prevent material from said second hopper escaping over the surface of said second drum, and means including a sprocket chain connecting said drums, whereby rotation of said first drum will cause equal degree of rotation of said second drum.

3. In a proportioner and mixer of the character described, the combination of a cylindrical drum secured on a horizontal axial shaft, a pair of identical diametrically opposite pockets extending inwardly from the cylindrical surface of said drum, a stationary hopper positioned above said drum for discharging into said pockets consecutively, flanges extending outwardly from the bottom of said hopper and following the contour of the adjacent portion of the drum surface, wiper blades between said flanges and the drum surface to prevent material from said hopper escaping over the surface of said drum, a pair of arms pivotally mounted on a horizontal axis, said axis being parallel to said drum shaft, said drum shaft journaled on said pair of arms at one side of the pivotal mounting of said arms to enable said drum to overbalance said arms, means limiting the movement of said arms, adjustable means normally holding said arms in substantially horizontal position with said drum in raised position adjacent the bottom of said hopper but enabling said arms to become tilted and said drum to drop to lowered position when the weight of material deposited in a drum pocket exceeds a predetermined amount, a cam arm secured to said drum shaft, engageable shoulders on the ends of said cam arm, a stationary engaging element positioned above said cam arm to engage one of said shoulders of said cam arm whenever said drum is in raised position with one of said pockets in registration with said hopper, said element, said cam arm and said hopper so arranged that when said drum is in raised position with a pocket in registration with said hopper said registering pocket will be off-center on said drum, whereby when a deposit of material from said hopper into such registering pocket is of sufficient amount to cause said drum and said deposited material to tilt said arms and move said drum to lowered position said cam arm will momentarily become disengaged from said stationary engaging element and said drum will be partially rotated by the weight of material in such pocket until the material is discharged from the pocket, a second cylindrical drum rotatably mounted on a stationary horizontal axis near said first drum, said second drum having a pair of diametrically opposite pockets, a hopper above said second drum adapted to discharge into said second drum pockets successively, a shield connected with the bottom of said second hopper and extending over said second drum to prevent material from said second hopper escaping over the surface of said second drum, wiper blades on said shield, and means including gears connecting said drums, whereby rotation of said first drum will cause equal degree of rotation of said second drum, said drums rotating towards each other.

4. The combination set forth in claim 3 with the addition of an adjustable partition in each of said second drum pockets for adjusting the effective size and capacity of the pockets.

5. A proportioner and mixer including a rotatable cylindrical drum mounted on a horizontal axial shaft, a plurality of identical symmetrically-positioned pockets extending inwardly from the cylindrical surface of said drum, a stationary hopper positioned above said drum for discharging into said pockets consecutively, flanges extending outwardly from the bottom of said hopper and following the contour of the adjacent portion of the drum surface, a frame pivotally mounted on a horizontal axis, said axis being parallel to said drum shaft said drum shaft supported on said frame at one side of the pivotal mounting of said frame to enable said drum to overbalance said frame, means limiting the movement of said frame, adjustable means on said frame normally holding said frame in substantially horizontal position with said drum in raised position adjacent the bottom of said hopper but enabling said frame to become tilted and said drum to drop to lowered position when the weight of material deposited in a drum pocket exceeds a predetermined amount, an engageable member connected with and rotated with said drum, engageable shoulders on said member, a stationary engaging element positioned above said engageable member to engage one of said shoulders of said member whenever said drum is in raised position with one of said pockets in registration with said hopper, said element, said member and said hopper so arranged that when said drum is in raised position with a pocket in registration with said hopper said registering pocket will be off-center on said drum, whereby when a deposit of material from said hopper into such registering pocket is of sufficient amount to cause said drum and said deposited material to tilt said frame and move said drum to lowered position said engageable member will momentarily become disengaged from said stationary engaging element and said drum will be partially rotated by the weight of material in such pocket until the material is discharged from the pocket, a second cylindrical drum rotatably mounted on a stationary horizontal axis near said first drum, said second drum having the same number of symmetrically-positioned pockets as said first drum, a hopper above said second drum adapted to discharge into said second drum pockets successively, a shield connected with the bottom of said second hopper and extending over said second drum to prevent material from said second hopper escaping over the surface of said second drum, means including a sprocket chain and gears connecting said drums, whereby rotation of said first drum will cause equal degree of rotation of said second drum, said drums rotating towards each other, and a receptacle below said drums to receive the materials simultaneously discharged from said drums.

References Cited in the file of this patent

UNITED STATES PATENTS

| Number | Name | Date |
|---|---|---|
| 1,198,900 | Eggert | Sept. 19, 1916 |
| 1,269,451 | Jackson | June 11, 1918 |
| 1,279,804 | Welcker | Sept. 24, 1918 |
| 2,230,846 | Pettett | Feb. 4, 1941 |